(12) United States Patent
Pei et al.

(10) Patent No.: US 7,872,706 B2
(45) Date of Patent: Jan. 18, 2011

(54) POLARIZED LIGHT-EMITTING DEVICE

(75) Inventors: Ting-Hang Pei, Tai-Chung (TW); Wei-Chou Chen, Hsin-Chu (TW)

(73) Assignee: HannStar Display Corp., Yang-Mei, Tao-Yuan Hsien (TW)

( * ) Notice: Subject to any disclaimer, the term of this patent is extended or adjusted under 35 U.S.C. 154(b) by 733 days.

(21) Appl. No.: 11/864,924

(22) Filed: Sep. 29, 2007

(65) Prior Publication Data

US 2009/0015758 A1 Jan. 15, 2009

(30) Foreign Application Priority Data

Jul. 10, 2007 (TW) .............................. 96125087 A

(51) Int. Cl.
 *G02F 1/1335* (2006.01)
 *G02F 1/00* (2006.01)
(52) U.S. Cl. ............................ 349/69; 349/70; 359/321
(58) Field of Classification Search ........................ None
 See application file for complete search history.

(56) References Cited

U.S. PATENT DOCUMENTS

| | | | | |
|---|---|---|---|---|
| 6,563,141 B1 * | 5/2003 | Dawson et al. | ................. | 257/98 |
| 7,136,217 B2 | 11/2006 | Kawakami et al. | | |
| 7,663,153 B2 * | 2/2010 | Huang et al. | .................. | 257/98 |
| 7,819,558 B2 * | 10/2010 | Parker et al. | ................. | 362/331 |
| 2004/0080808 A1 * | 4/2004 | Kawakami et al. | .......... | 359/321 |

* cited by examiner

*Primary Examiner*—Tina M Wong
(74) *Attorney, Agent, or Firm*—Winston Hsu; Scott Margo

(57) ABSTRACT

Polarized light-emitting device with a light source, multiple layers of first optical thin films and second optical thin films alternately stacked is disclosed. Each first optical thin film has a number of first geometric units, and each second optical thin film has a number of second geometric units. The first geometric units and the second geometric units are arranged as a secondary periodic structure on the light-emitting surface of the light source. The polarized light-emitting device is able to provide polarized light with higher brightness and polarized light of a specified polarization characteristic.

18 Claims, 11 Drawing Sheets

POLARIZED LIGHT-EMITTING DEVICE

BACKGROUND OF THE INVENTION

1. Field of the Invention

The present invention is related to a polarized light-emitting device, and in particular, to a polarized light-emitting device for use in LCD backlight unit.

2. Description of the Prior Art

The backlight unit is one of the critical components for the liquid crystal display, LCD, and because the LCD panel itself does not possess the capability for emitting light itself, therefore, it requires having a backlight unit for providing adequate brightness and a light source with even distribution. Currently, LCDs are widely used in monitor systems, notebook computers, digital cameras, projectors, and other electronic products having growth potentials, thereby driving the continued growth of the demand for the backlight unit and its corresponding components.

Referring to FIG. 1, an illustrative structural diagram of a conventional LCD module is shown. The conventional LCD module includes a LCD panel 2, a lower polarizing film 4, an upper polarizing film 6, and a backlight unit 8, in which the LCD panel 2 includes a TFT substrate, an alignment layer, a liquid crystal layer, a color filter, and other devices, for forming as the main component devices for the LCD. The operating principle of the LCD is by means of using the photoelectric characteristics of the liquid crystal material, through applying an outside electrical field to change the orientation direction of the liquid crystal for displaying under different brightness modes, and also using a lower polarizing film and a color filter for displaying the images. The backlight unit of the current LCD is mostly using the CCFL or the light-emitting diode (LED) as the primary backlight light source, in which the LED possesses reduced drive voltage, longer lifetime, higher luminous efficiency, mercury-free, improved color reproduction, and other special features; therefore, the LED seems to possess the potential for replacing CCFL. However, the light as produced by the LED, prior to being transmitted to the LCD panel, due to different refractive indices of the transmitted media, is constrained by the critical angles. In other words, when the incident angle of the incident light is larger than the critical angle, the incident light is totally reflected by the optical film, and is not able to refract through the optical film and to provide the LCD panel with an adequate light source. At the same time, the light of the backlight unit has to penetrate through the lower and upper polarizing films for producing the polarization effect. During the process, more than half of the incident light is absorbed by the polarizing film. Due to the excessive loss of incident light from the LED as described above, it is an important subject in backlight design to improve the transmitted efficiency of the light from the source.

SUMMARY OF THE INVENTION

Therefore, an object of the present invention is to provide a polarized light-emitting device, which directly provides the optical polarization of high-brightness and simplifies the conventional LCD structure further.

To achieve the aforementioned object, the present invention provides a polarized light-emitting device, which includes a light source, a first optical thin film and a second optical thin film disposed at the emitting direction of the light source. The thickness of the first optical thin film is $d_1$; and the first optical thin film includes a repetition of first geometric units having a width $a_1$, in which the first geometric units are arranged in a repeated stacking structure along the first direction, where $0.2 \leqq d_1/a_1 \leqq 2$. Furthermore, the thickness of the second optical thin film is $d_2$; and the second optical thin film includes a repetition of second geometric units having a width $a_2$, in which the second geometric units are arranged in a repeated stacking structure along the first direction, where $0.2 \leqq d_2/a_2 \leqq 2$.

The polarized light-emitting device of the present invention is able to directly provide polarized light with a specified polarization characteristics, the emittance of which can also have enhancement when using the polarized light-emitting device in the backlight unit of the present invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
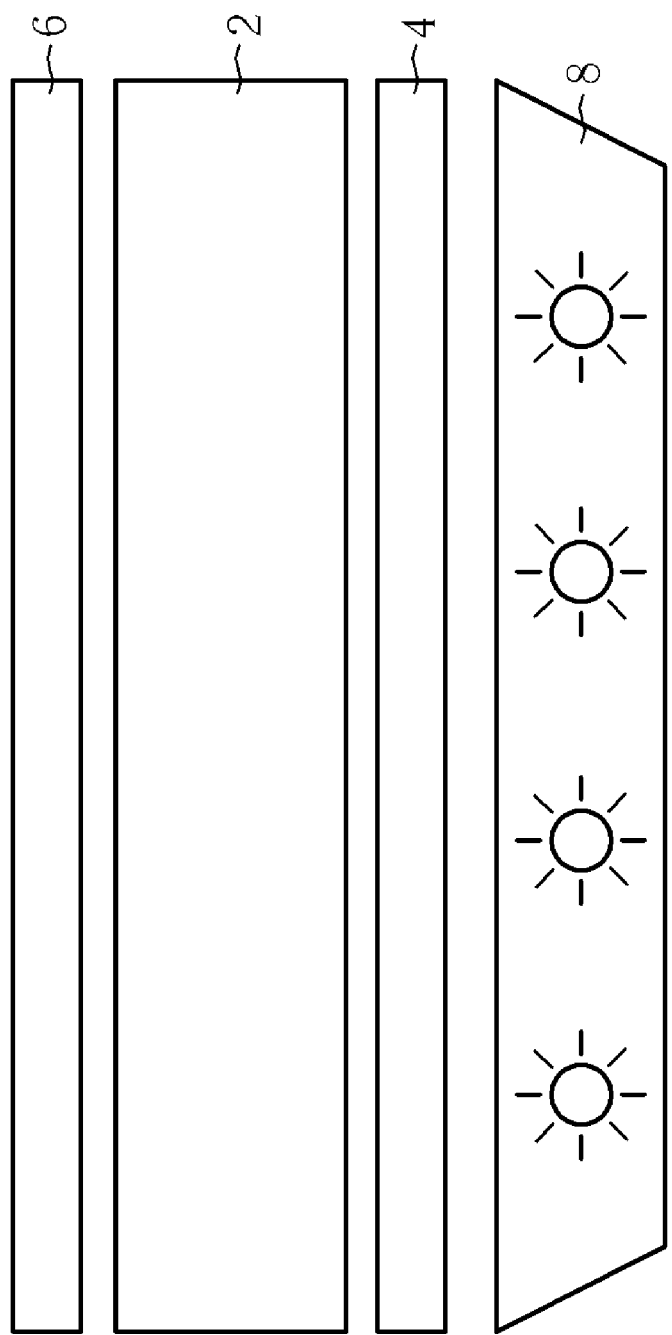
FIG. 1 is a structural illustrative diagram of a conventional LCD.

Hereinafter, preferred embodiments of the present invention will be described with reference to the accompanying drawings, in which components with substantially the same functions are identified by the same reference numeral for the sake of simplicity. It should be noted, however, that the present invention is in no way being limited to the following illustrative embodiments.

Figure 2:
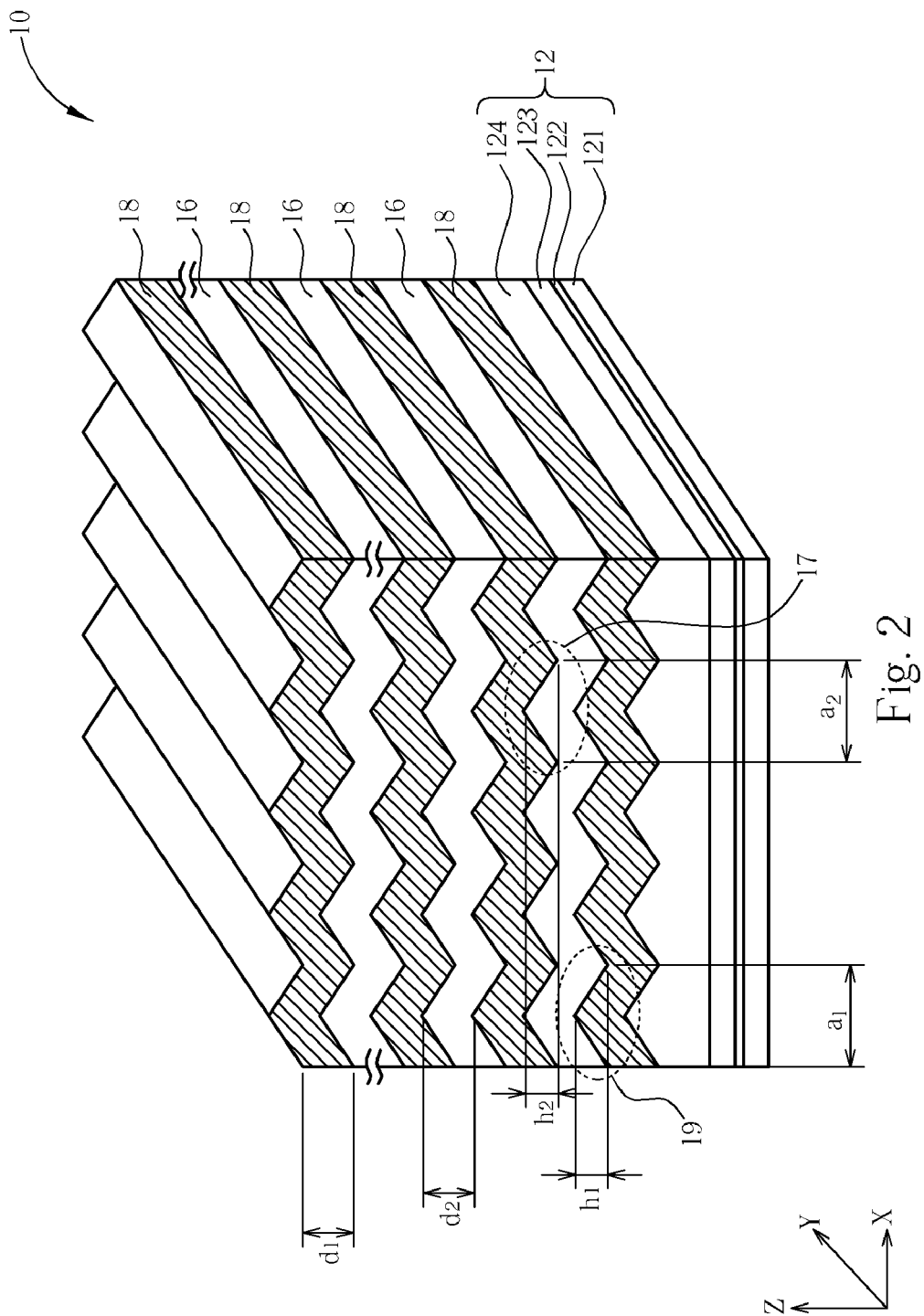
FIG. 2 is a perspective view of a polarized light-emitting device according to a first preferred embodiment of the present invention.

FIG. 2 is an illustrative schematic drawing of a polarized light-emitting device 10 according to a first embodiment of the present invention. The polarized light-emitting device 10 includes a light source 12, a plurality of first optical thin film layers 18, and a plurality of second optical thin film layers 16; the first optical thin film layers 18 and the second optical thin film layers 16 are sequentially stacked in a staggered manner at the light-emitting side of the light source 12. The thickness of the first optical thin film 18 is $d_1$, and includes a plurality of first geometric units 19. The first geometric unit 19 is sequentially configured to form a structure in the form of a sawtooth cross section, and having the width and height as $a_1$ and $h_1$, respectively. Furthermore, the thickness of the second optical thin film 16 is $d_2$, and comprising of a plurality of second geometric units 17; the second geometric unit 17 are sequentially arranged to form a sawtooth cross section structure, and the respective width and height are $a_2$ and $h_2$.

Considered as a whole, the first geometric unit 19 and the second geometric unit 17 are repeatedly arranged in a staggered manner along the x-direction (first direction), y-direction, or z-direction (second direction), and thereby to form the secondary periodic structure of the sawtooth cross section as illustrated in FIG. 2. Furthermore, the interface sections between the light source 12 and the optical thin films are not being limited to having only the sawtooth cross section as illustrated in FIG. 2, but can also take on the form of a horizontal cross section, a waveform section, or sections having other shapes, and these periodic structures when having dimensions inside the nanometer class, would be able to produce the polarization effect.

Figure 3:
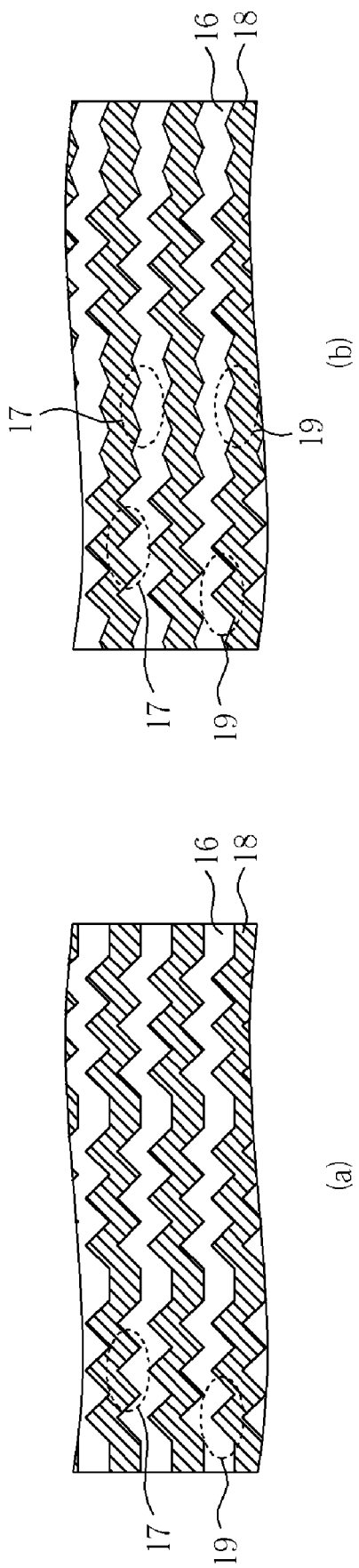
FIGS. 3(a)-3(b) are a repetition sectional views showing the first geometric unit and the second geometric unit according to other embodiments of the present invention.

Furthermore, the dimensions of the first geometric unit 19 and of the second geometric unit 17 are not limited to those illustrated in FIG. 2 of the present invention. The stacking configuration of the sawtooth cross section and other configurations of the sawtooth cross section structures can be as illustrated in FIG. 3a, in which the sawtooth cross section structures exhibits loose and tight intervals, or as illustrated in FIG. 3b, for forming the sawtooth cross section structures having different sizes.

In the present embodiment, the light source 12 can be an LED device, which includes an n-type semiconductor layer 121, an active layer 122, a p-type semiconductor layer 123, and a window layer 124, which are stacked sequentially for providing the illumination of having different wavelengths. And the refractive indices of the first optical thin film 18 and the second optical thin film 16, which comprise of a secondary periodic structures, are $n_1$ and $n_2$ respectively, in which, the first optical thin film 18 can be made of silicon (Si), germanium (Ge), gallium arsenide (GaAs) or combinations thereof, or other dielectric materials having refractive index greater than 2. And the second optical thin film layer 16 includes silicon oxide ($SiO_2$), magnesium oxide (MgO), aluminum oxide ($Al_2O_3$), silicon nitride ($Si_xN_y$), and combinations thereof, or other dielectric materials having refractive index not equal to that of the first optical thin film 18. At the same time, the bigger the refractive index difference between the first optical thin film 18 and the second optical thin film 16 the better it is to be. Furthermore, when selecting the first optical thin film 18 and the second optical thin film 16 material, it is necessary to consider the absorption coefficient of light of the material itself in the applied frequency band. The preferred one is to be selected based on having the smallest absorption coefficient in the applied frequency band.

Furthermore, besides having the sawtooth cross section as illustrated in the figures, the periodic structure comprising of the first optical thin film 18 and the second optical thin film 16 in the first embodiment can also take on other forms such as sphere, rectangular, hexagonal, corrugated, and other different geometric shapes, which are also applicable in the present invention. Specifically speaking, using the sawtooth cross section of the first optical thin film 18 and the second optical thin film 16 as illustrated in FIG. 2 as an example, when the dimensions of the first geometric unit 19 and the second geometric unit 17 are of the same, therefore, the width $a_1$ of the first geometric unit 19 is the same as width $a_2$ of the second geometric unit, the height $h_1$ of the first geometric unit 19 is the same as the height $h_2$ of the second geometric unit 17. During the fabrication process of the polarized light-emitting device 10, the dimensions of $a_1$, $a_2$ are to be set as the wavelength of the emitting light from the light source 12, $\lambda$, multiplied by the (normalized frequency) f, that is to say, in the first embodiment, $a_1=a_2=\lambda f$, and the calculation of f is described in the drawings as described below. Furthermore, when manufacturing the polarized light-emitting device 10, the thickness $d_1$ of the first optical thin film 18, the thickness $d_2$ of the second optical thin film 16, the height $h_1$ of the first geometric unit 19, and the height $h_2$ of the second geometric unit 17 would be set in multiples of the width $a_1$ of the first geometric unit 19 or the width $a_2$ of the second geometric unit 17, such as for example, $d_1=ia_1$, $d_2=ja_2$, $h_1=ka_2$, $h_2=la_2$, in which i, j, k, l are constants, and the exact values of these constants are determined according to production or product requirements.

Figure 4:
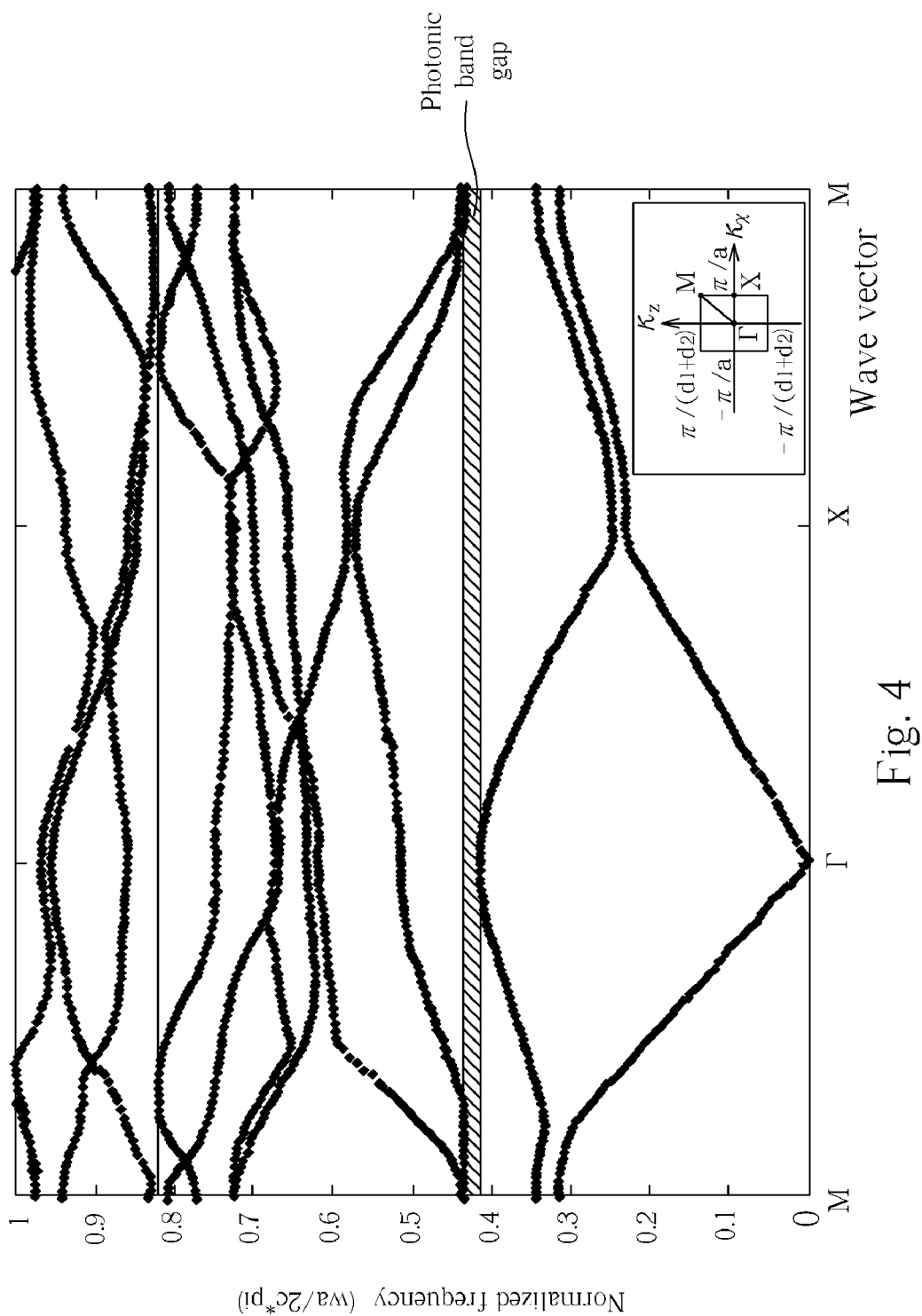
FIG. 4 is a relationship diagram illustrating the wave vector with respect to the incident light normalized frequency according to the first embodiment of the present invention.

FIG. 4 is a relationship diagram illustrating the wave vector of the incident light versus the incident light normalized frequency for the first embodiment, as the incident light produced by the light source 12 is emitted to the first optical thin film 18 and the second optical thin film 16, which are alternatingly stacked. The incident light from the light source 12 includes the TE polarized light (transverse electric mode) perpendicular to the field direction and the light ray application direction (z-direction) and the TM polarized light (transverse magnetic mode) perpendicular to the field direction and the light ray application direction. FIG. 4 shows the calculation of the renormalized frequency f corresponding to the wave vector k along the edge of the first Brillouin zone by using a plane-wave expansion method and instituting the Fourier series expansions of the dielectric constant, electric field, and magnetic field into the Maxwell's equation. FIG. 4 shows an example of the TE polarized light. One can detect that the polarized light after transmitting through the alternating stack of the first optical thin film 18 and second optical thin film 16 to prove the existence of the photonic band gap which is a frequency range that incident light can't emit into the optical thin film. Because the frequency is inside the photonic band gap, the TE polarized light doesn't have a corresponding propagating mode; therefore, the TE polarized light would be completely reflected back. The TM polarized light can have a corresponding propagating mode within this frequency range; therefore, the TM polarized light would penetrate through the optical thin film. The frequency range within one photonic band gap is the operated frequency range for these polarization devices. Furthermore, the relationship diagram for the wave vectors of these optical thin films and the incident light normalized frequencies are varied in accordance with the thicknesses and refractive indices of the first optical thin film 18 and the second optical thin film 16, and the width and height of the geometric units. The frequency range value of the photonic band gap is not restricted to those shown in the frequency range of FIG. 4. When selecting materials with different refractive indices to constitute these optical thin films, the photonic band gap and the frequency range size are to be determined and adjusted according to the materials. The frequency range size of the photonic band gap affects the design ability of these optical thin films in polarized light-emitting devices. The larger photonic band gap is, the better design of the photonic band gap is.

Figure 5:
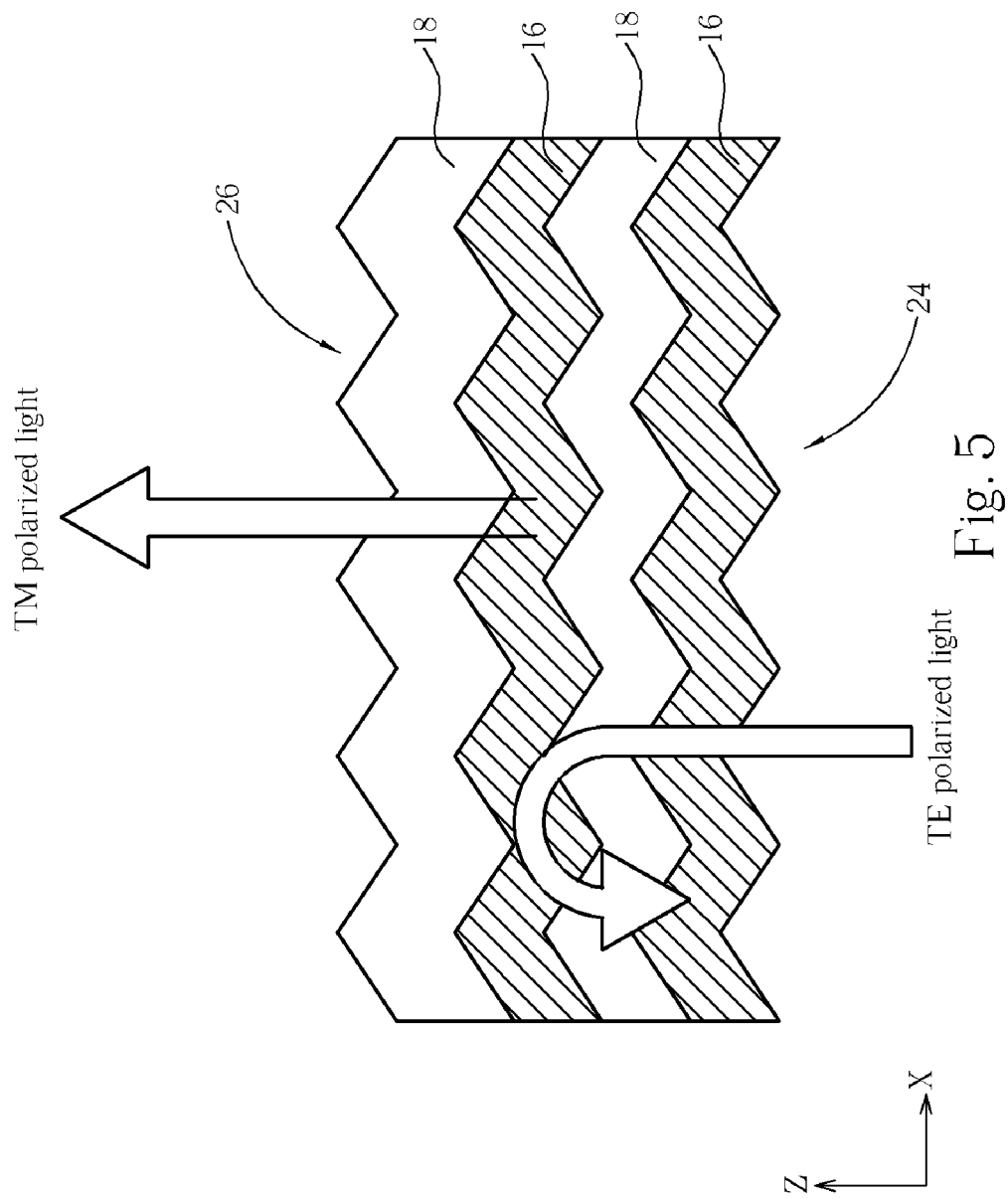
FIG. 5 is an illustrative diagram showing the using of the optical thin films for screening polarized light having a specified polarization characteristic.
Figure 6:
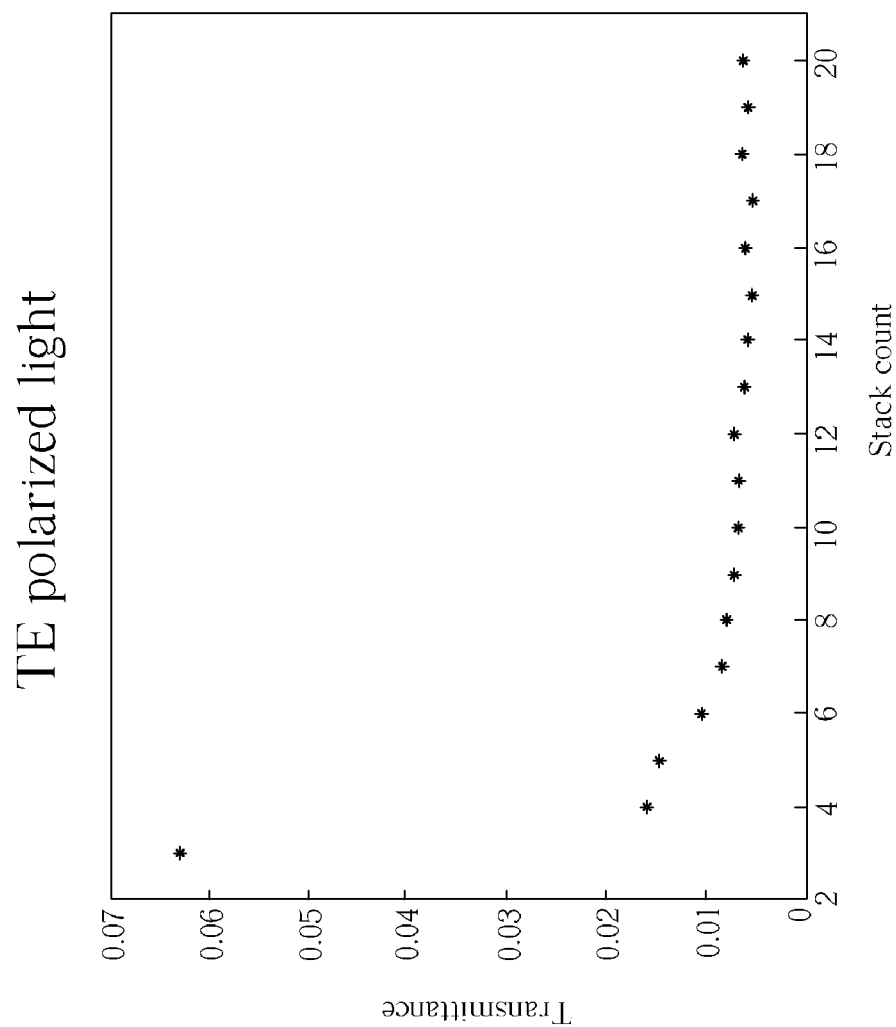
FIGS. 6-7 include a quantifying method for illustrating the results obtained by the screening of TE polarized light and TM polarized light by the optical thin films.
Figure 7:
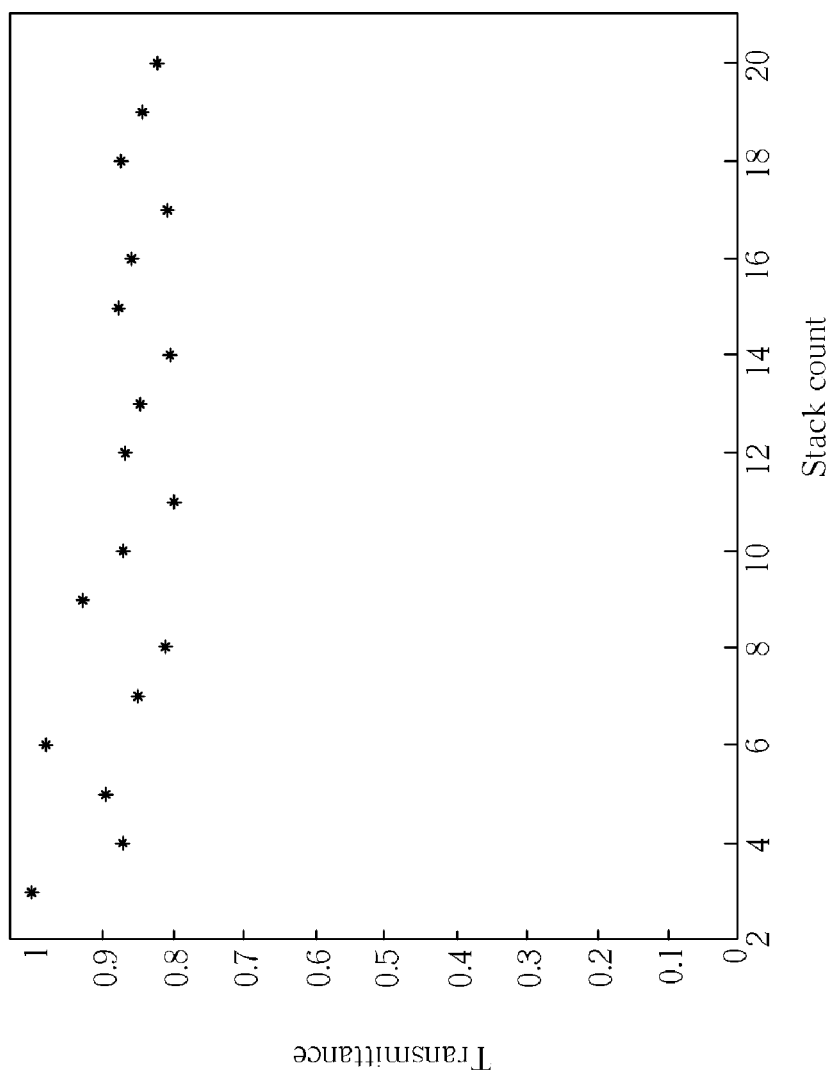

FIG. 5 is an illustrative diagram showing the use of these optical thin films having a specified polarization characteristic. The first optical thin film 18 and the second optical thin film 16 are disposed on the light-emitting side of the light source 12; the light ray produced by the light source 12 (not illustrated in the drawings) includes the TE polarized light and the TM polarized light. The optical thin films as described in the embodiments of the present invention in conjunction with the light source 12 producing the light rays, are able to produce polarized light rays after passing through the optical thin films. FIGS. 6 and 7 show a quantifying method for checking the results obtained from FIG. 5, in which, the x-axis represents the stacks of the first optical thin film 18 and the second optical thin film 16; and each structure for one stack includes a set of a first optical thin film 18 and a second optical thin film 16 of the present invention; and the y-axis is to represent the transmissions of the TE polarized light and the TM polarized light, respectively.

Referring again to FIG. 4, in the first embodiment, when selecting the first optical thin film 18 with refractive index $n_1=3.5$ and the second optical thin film 16 with refractive index $n_2=1.5$ to alternatingly stack at the light-emitting side of the light source 12, a photonic band gap exists at the frequency range between 0.415 to 0.435. Furthermore, as seen from FIGS. 6 and 7, when the stacks exceed 4, the transmittance of the TE polarized light decreases as the stacks for the optical thin films increased. Finally, the transmittance of TE polarized light in the forward direction approaches about 0.006; and after the stacks exceed 8, the transmittance of the TM polarized light in the forward direction after transmitting through the optical thin film, approaches about 0.82. When the stacks of the optical thin films exceed 8, the transmittance of the TM polarized light is 60~170 times that of the TE polarized light, and the preferred stacks is 15 in the present embodiment. Therefore, making use of the transmittance differences due to alternatingly stacked layers of the first optical thin film 18 and the second optical thin film 16 for the TM polarized light and the TE polarized light, the polarization device is thus further illustrated to possess the polarized characteristic for the present invention.

Figure 8:
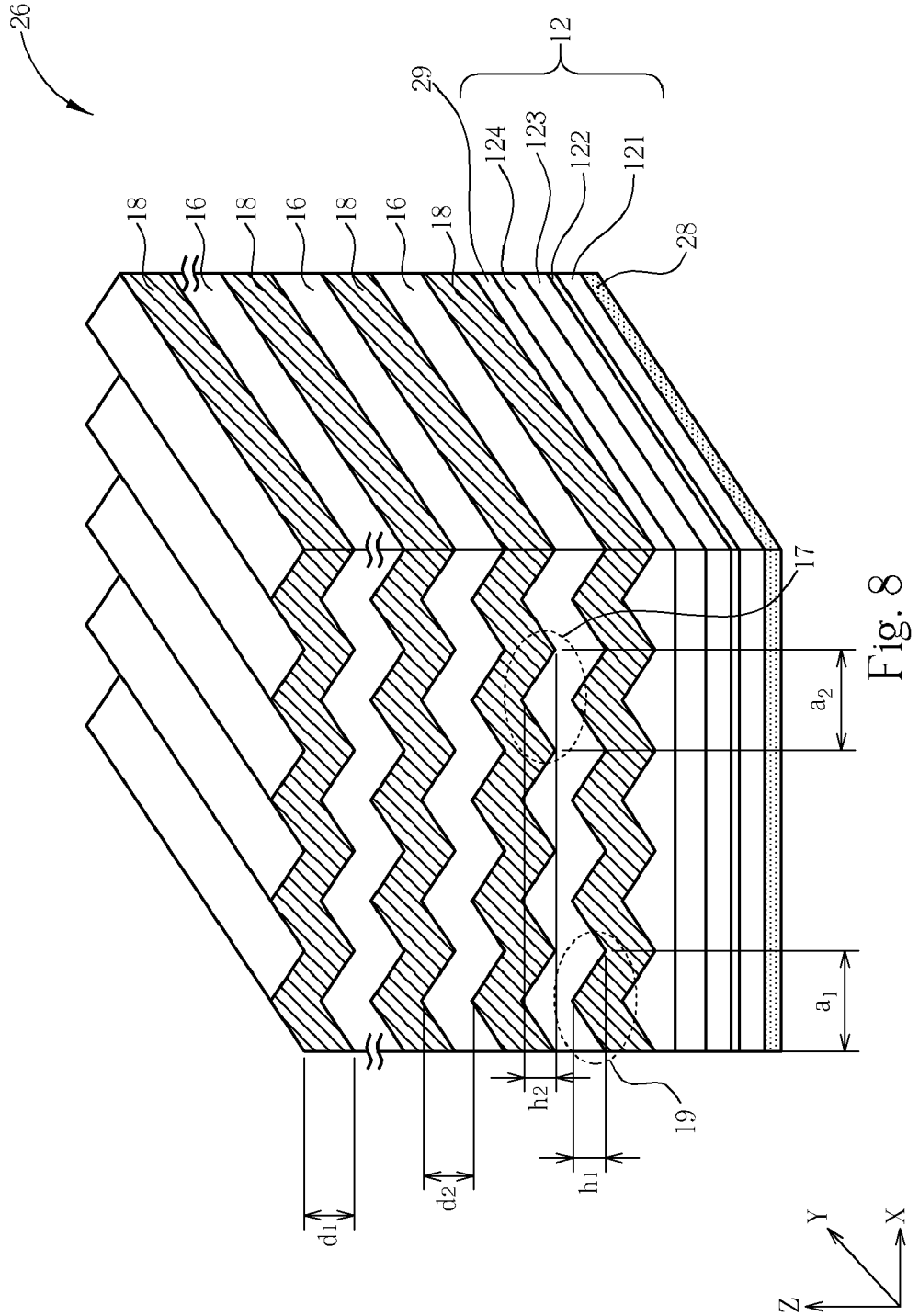
FIG. 8 is an illustrative schematic of a polarized light-emitting device according to a second embodiment of the present invention.

Besides the implementation method described in the first embodiment of having the directly stacked layers of the first optical thin film 18 and the second optical thin film 16 on the surface of the light source 12, consider the higher sensitivity of moisture or oxygen on the light source 12, a protective material needs to be disposed in between the light source 12 and the first optical thin film 18 and the second optical thin film 16 for stopping moisture or oxygen entering the light source 12, thereby extending the lifespan of the polarized light-emitting device of the present invention. FIG. 8 shows an illustrative schematic for a polarized light-emitting device 26 for a second embodiment of the present invention, which is the same elements/devices and element numbers as the aforementioned first embodiment. The differences between the present embodiment and the first embodiment are as follows: an encapsulation structure 29 disposed between the light source 12 and the first optical thin film 18; and an another reflective layer 28 disposed at the polarized light-emitting device 26 corresponding to the light-emitting side of the light source 12. The encapsulation structure 29 disposed between the light source 12 and the optical thin films can be made of resin, silicon oxide, or other materials which are able to isolate from moisture and oxygen to surround the outside portion of the light source 12 for protecting the light source 12. The refractive index difference between the refractive index of the material of the encapsulation structure 29 and the refractive index of the first optical thin film 18 is less than 1. Furthermore, the surface between the encapsulation structure 29 and the first optical thin film 18 is not limited to having only the sawtooth cross section as illustrated in the figures, but can also forms a planar cross section or other various shapes, which is compatible with these optical thin films. Furthermore, when selecting material for the encapsulation structure 29, it is to be necessary at the same time to consider the refractive index of the material itself, the preferred selection based on a refractive index difference between the refractive index of the encapsulation structure 29 material and the refractive index of the light source 12 material is less than one. With regards to the reflective layer 26 disposed at the bottom side of the polarized light-emitting device 26, the reflective layer 26 material can be silver (Ag), aluminum (Al), gold (Au), other metals, or other materials possessing superior reflective properties. The objective is to allow the reflected TE polarized light after reflected from the first optical thin film 18 or the second optical thin film 16 is able to be scattered as a mixed light source comprising of TM polarized light and TE polarized light. The mixed light again goes through the first optical thin film 18 and the second optical thin film 16 to increase the light source lighting efficiency of the light source 12.

Figure 9:
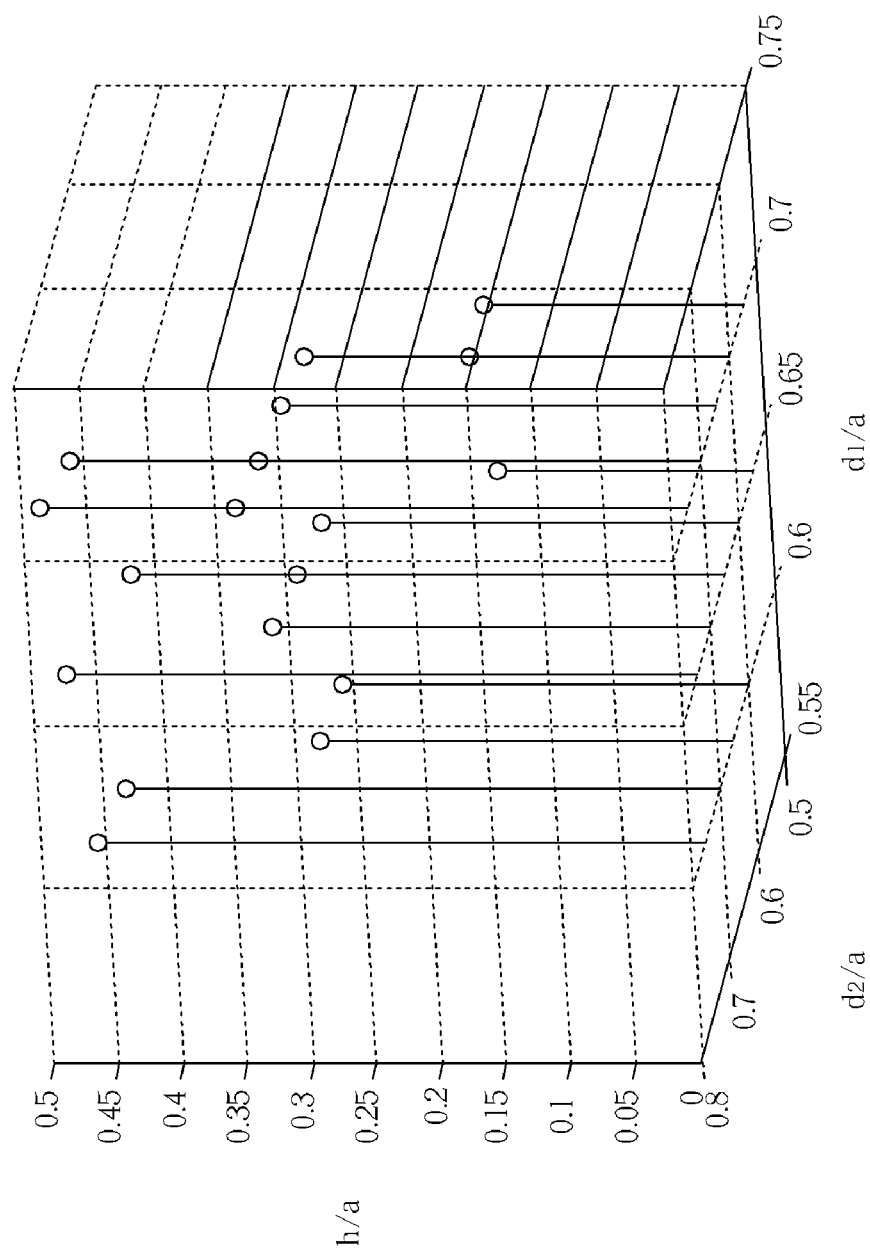
FIG. 9 is a relationship diagram relating to the optical thin film thicknesses, the geometric units dimensions, and the photonic band gap.

FIG. 9 is a relationship diagram for the TE polarized light after transmitting through the first optical thin film 18 with refractive index $n_1=4.01$ and the second optical thin film 16 with refractive index $n_2=1.5$, and each circle in the drawing represents that the TE polarized light with a corresponding photonic band gap, in which $d_1$ and $d_2$ are respectively the thicknesses of the first optical thin film 18 and the second optical thin film 16, h is the sum of the height $h_1$ of the first geometric unit 19 and the height $h_2$ of the second geometric unit 17 (which is $h=h_1+h_2$). The first geometric unit 19 of the first optical thin film 18 and the second geometric unit 17 of the second optical thin film 16 possess the same width a, which is $a_1=a_2=a$. As can be seen from FIG. 9, under a designated set of structural conditions, the TE polarized light has a corresponding photonic band gap, and therefore cannot transmit through the optical thin films. The TM polarized light does not have a corresponding photonic band gap, and therefore can easily penetrate through these optical thin films, thereby achieving the objective for segregating the TM and TE polarized light. Furthermore, FIG. 10 is an embodiment of FIG. 9, which describes the relationship between $d_1/a$ and $d_2/a$, when $h=0.25a$. h is the sum of the height $h_1$ of the first geometric unit 19 and the height $h_2$ of the second geometric unit 17 (which is $h=h_1+h_2$).

Figure 10:
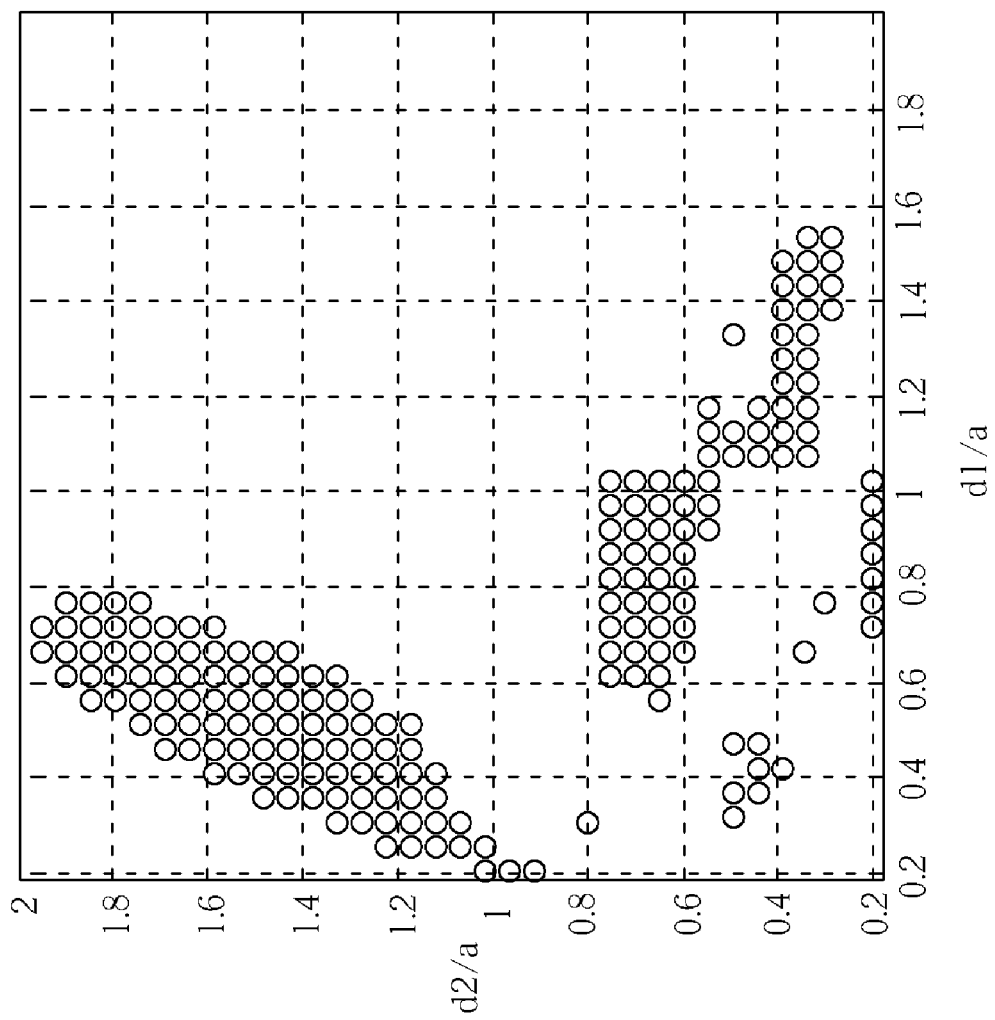
FIG. 10 is a relationship diagram of the embodiment of FIG. 9 showing the relationship between $d_1/a$ and $d_2/a$, when $h=0.25a$.

According to the results shown in FIGS. 9-10, when fabricating the polarized light-emitting device 10 for achieving the objective of the aforementioned segregation of the polarized light, the preferred ratio between the thickness $d_1$ of the first optical thin film 18 and the width $a_1$ of the first geometric unit 17 is between about 0.2 to 2, or, $0.2 \leq d_1/a_1 \leq 2$; the preferred ratio between the thickness $d_2$ of the second optical thin film 16 and the width $a_2$ of the second geometric unit 17 is between 0.2 to 2; or $0.2 \leq d_2/a_2 \leq 2$; the preferred ratio between h and a is between 0.2 to 2, or $0.2 \leq h/a \leq 2$.

Figure 11:
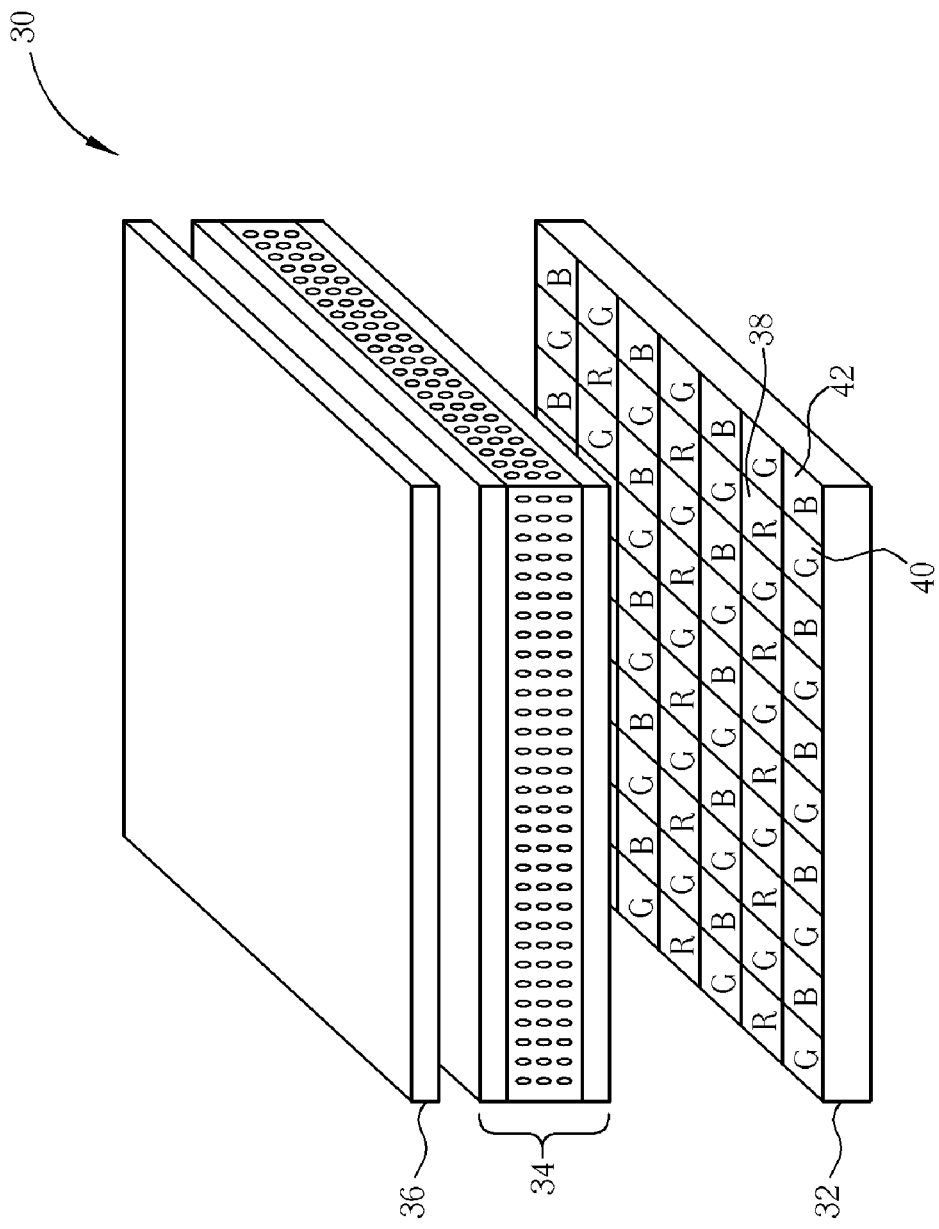
FIG. 11 a structural illustrative diagram of a LCD using the backlight unit made by the polarized light-emitting device combinations according to the embodiments of the present invention.

Because the polarized light device of the present invention comprise of the capability for directly providing TM polarization function, and after performing sufficient bonding and coupling to other optical devices or electrical circuits, the polarized light device thereby can be adopted for use as backlight unit for LCD or other display devices. Using the red-blue-green backlight unit as an example, according to the calculation results, using the blue LED capable of producing a wavelength $\lambda=470$ nm, the structural parameters for the first optical thin film, the second optical thin film, the first geometric unit, the second geometric unit are $a_1=a_2=200$ nm, $d_1=90$ nm, $d_2=76$ nm, and $h_1=h_2=140$ nm. If taking the specifications of the first optical thin film, the second optical thin film, the first geometric unit, the second geometric unit are set as $a_1=a_2=225$ nm, $d_1=101$ nm, $d_2=86$ nm, and $h_1=h_2=158$ nm, the polarized light-emitting device with a green light source can be made as a green polarized-light LED of wavelength $\lambda=530$ nm. If the specifications for the first optical thin film, the second optical thin film, the first geometric unit, and the second geometric unit are $a_1=a_2=268$ nm, $d_1=121$ nm, $d_2=102$ nm, and $h_1=h_2=188$ nm, the red LED with wavelength $\lambda=630$ nm can thus be used for producing the polarized light-emitting device. The combinations of the polarized light-emitting devices of these red light source, green light source, and blue light source can be adopted in a backlight unit. As referred to FIG. 11, a structural illustrative diagram of a LCD 30 using the backlight unit made by using the polarized light-emitting device combinations according to the embodiments of the present invention is shown. The LCD 30 includes a backlight unit 32, a LCD panel 34, and an upper polarizing film 36, in which the LCD panel 34 is disposed at the light-emitting side of the backlight unit 32, the upper polarizing film 36 is disposed at another side of the LCD panel 34 with respect to the backlight unit 32. The detailed structural makeup for the LCD panel 34 and the upper polarizing film 36 are well known in the LCD industry, therefore no further descriptions are needed. The backlight unit 32 for the LCD 32 includes a plurality of red (R) polarized light-emitting devices 38, a plurality of green (G) polarized light-emitting devices 40, and a plurality of blue (B) polarized light-emitting devices 42, and other polarized light-emitting devices of different colors; and every four polarized light-emitting devices (G, R, G, B) are to form one unit, which are mutually adjacently arranged as a mosaic-type backlight light source array for providing polarization at the designated wavelengths. Because each polarized light-emitting device comprises of a plurality of optical thin films with sawtooth shaped cross section, apart from having the advantage of directly providing TM polarized light, the incident light rays can thereby be allowed to enter the optical thin films without being limited by the critical angles and increase the light-emitting ratio of the light rays exiting these optical thin films. As comparing to conventional LCD, the LCD 30 according to the present invention with the polarization devices and the embodiments of the present invention using as the polarization light source for the backlight unit 32 required by the LCD panel 34, can thus eliminate the necessary lower polarizing film of the conventional LCD and also eliminate the brightness enhancement film (BEF) to thereby provide the image display capability having higher brightness and improved color reproduction. Furthermore, the embodiments according to the present invention using, for example, red-blue-green colors as the backlight light source array, and other combinations of backlight light source array are also suitable for the present invention, such as: red, blue, green, and white (W) forming a backlight light source array with a set of four colors (RGBW pattern). The configuration method for the backlight light source array is not limited to the above-mentioned embodiment of the polarized light-emitting devices (G, R, G, B) or (R, G, B, W) forming one unit. A user can rearrange the configuration layout based upon product requirements. For example, in another embodiment, one can use three or more polarized light-emitting devices to form one unit, which is not limited to use the mosaic method for arrangement and placement.

In short, the polarized light-emitting device as provided by the embodiments of the present invention, can be adopted to a plurality of light rays with different wavelengths, and different optical thin films designs, for directly providing specified polarization characteristics and polarized light achieving higher brightness used in products required polarized light, such as projectors, LCDs, and other electronic products. The types of the polarized light are not limited to the TM polarized light of the aforementioned embodiment. Indeed, by changing the materials or structural parameters of the first optical thin film, the second optical thin film, the first geometric unit, and the second geometric unit, we can thus establish the particular type of polarized light to use, for example, the TE polarized light perpendicular to the electric field direction and the light ray application direction matching the needs of various optoelectronics products. Furthermore, the light source producing light rays are not limited to the LED devices of the aforementioned embodiments, other active light emitting devices or structures can also be adopted to use in the present invention, such as organic light-emitting diode (OLED), laser diode (LD).

Those skilled in the art will readily observe that numerous modifications and alterations of the device and method may be made while retaining the teachings of the invention.

What is claimed is:

1. A polarized light-emitting device, comprising:
    a light source for emitting blue light having a wavelength $\lambda$, wherein the wavelength $\lambda=470$ nanometers;
    a first optical thin film disposed at the light-emitting side of the light source, having a thickness $d_1$ and a height $h_1$, and comprising a plurality of first geometric units having a width $a_1$, wherein $0.2 \leq d_1/a_1 \leq 2$; and
    a second optical thin film covering the first optical thin film, having a thickness $d_2$ and a height $h_2$, and comprising a plurality of second geometric units having a width $a_2$, wherein $0.2 \leq d_2/a_2 \leq 2$;
    wherein the first geometric unit and the second geometric unit is repeatedly arranged along a first direction; and
    wherein $a_1=a_2=200$ nm, $d_1=90$ nm, $d_2=76$ nm, and $h_1=h_2=140$ nm.

2. The polarized light-emitting device as claimed in claim 1, further comprising n layers of the first optical thin film and m layers of the second optical thin film alternatingly and sequentially stacked each other, wherein n and m are equal or larger than 4.

3. The polarized light-emitting device as claimed in claim 1, wherein the refractive index of the first optical thin film is different from the refractive index of the second optical thin film.

4. The polarized light-emitting device as claimed in claim 1, wherein the refractive index of the first optical thin film or the second optical thin film is larger than 2.

5. The polarized light-emitting device as claimed in claim 1, wherein the first geometric unit or the second geometric unit are alternately arranged along a second direction perpendicular to the first direction.

6. The polarized light-emitting device as claimed in claim 1, wherein one of the first geometric unit or the second geometric unit comprises a sawtooth cross section structure.

7. The polarized light-emitting device as claimed in claim 1, further comprising an encapsulation structure disposed between the light source and the first optical thin film.

8. The polarized light-emitting device as claimed in claim 7, wherein the difference between the refractive index of the encapsulation structure and the refractive index of the first optical thin film is less than 1.

9. The polarized light-emitting device as claimed in claim 7, wherein the difference between the refractive index of the encapsulation structure and the refractive index of the light source is less than 1.

10. The polarized light-emitting device as claimed in claim 7, wherein the material of encapsulation structure is resin or silicon oxide.

11. The polarized light-emitting device as claimed in claim 1, wherein the first optical thin film is made of silicon (Si), germanium (Ge), gallium arsenide (GaAs), or combinations thereof.

12. The polarized light-emitting device as claimed in claim 1, wherein the second optical thin film is made of silicon oxide ($SiO_2$), magnesium oxide (MgO), aluminum oxide ($Al_2O_3$), silicon nitride ($Si_xN_y$), or combinations thereof.

13. The polarized light-emitting device as claimed in claim 1, further comprises a reflective layer disposed at another side of the corresponding light-emitting side of the light source.

14. The polarized light-emitting device as claimed in claim 13, wherein the reflective layer is made of silver (Ag), aluminum (Al), or gold (Au).

15. The liquid crystal display as claimed in claim 1, wherein the light source comprises a blue light emitting device.

16. A liquid crystal display, comprising:
a light source for emitting blue light having a wavelength $\lambda$, wherein the wavelength $\lambda$=470 nanometers;
a first optical thin film disposed on the surface of the light source, having a thickness $d_1$ and a height $h_1$, and comprising a plurality of first geometric units having a width $a_1$, wherein $0.2 \leq d_1/a_1 \leq 2$;
a second optical thin film covering the first optical thin film, having a thickness $d_2$ and a height $h_2$, and comprising a plurality of second geometric units having a width $a_2$, wherein $0.2 \leq d_2/a_2 \leq 2$;
a liquid crystal display panel disposed above the light source, the first optical thin film, and the second optical thin film; and
an upper polarizing film disposed on the LCD panel;
wherein $a_1=a_2=200$ nm, $d_1=90$ nm, $d_2=76$ nm, and $h_1=h_2=140$ nm.

17. The liquid crystal display as claimed in claim 16, wherein the light source comprises a blue light emitting device.

18. The liquid crystal display as claimed in claim 17, wherein the light emitting device is a light-emitting diode (LED), an organic light-emitting diode (OLED), or a laser diode (LD).

* * * * *